Aug. 13, 1968 W. E. MADDOCK 3,396,946
ATTACHMENT FOR A BACKHOE OR OTHER VEHICLE
Filed Jan. 23, 1967 2 Sheets-Sheet 1

INVENTOR.
WILLIAM E. MADDOCK
BY
Warren D. Hackbert
Attorney

Aug. 13, 1968 W. E. MADDOCK 3,396,946
ATTACHMENT FOR A BACKHOE OR OTHER VEHICLE
Filed Jan. 23, 1967
2 Sheets-Sheet 2
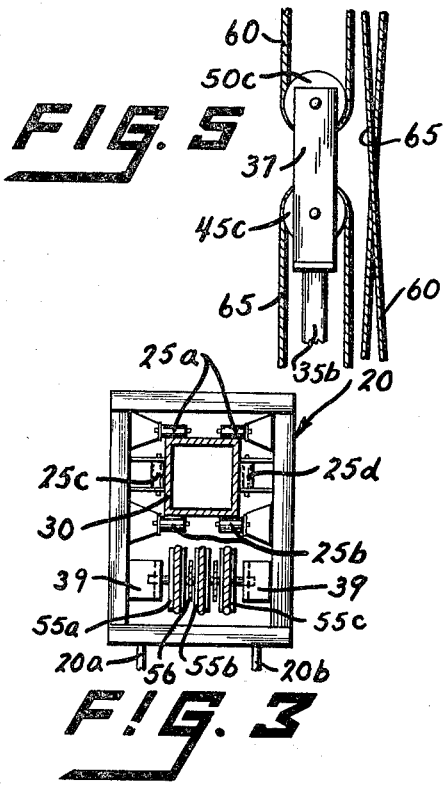
FIG. 5
FIG. 3
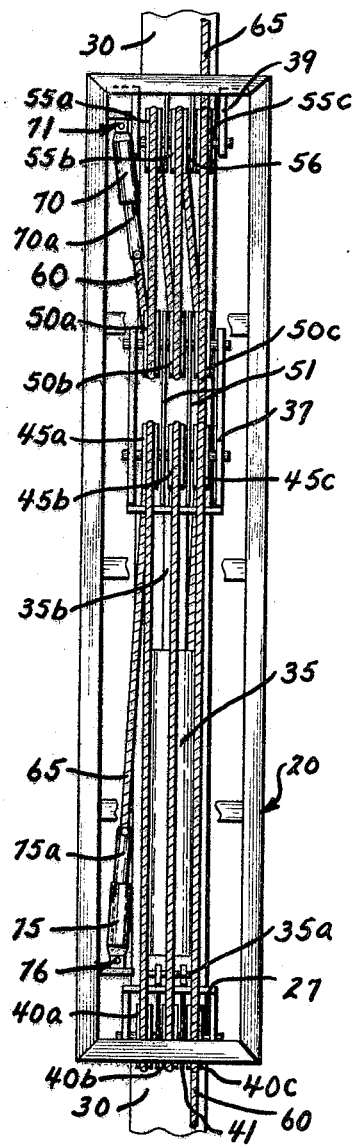
FIG. 2
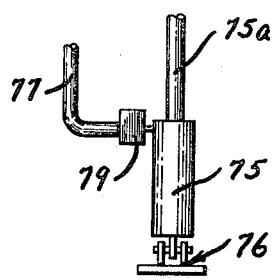
FIG. 4
INVENTOR.
WILLIAM E. MADDOCK
BY
*[signature]*
Attorney

# United States Patent Office 3,396,946
Patented Aug. 13, 1968

3,396,946
ATTACHMENT FOR A BACKHOE OR OTHER VEHICLE
William E. Maddock, Bicknell, Ind., assignor of one-half to Garrel O. Day, Bicknell, Ind.
Filed Jan. 23, 1967, Ser. No. 610,872
7 Claims. (Cl. 254—189)

ABSTRACT OF THE DISCLOSURE

An equipment attachment for various end purposes having a movable mast hydraulically controlled with high mechanical advantage through a piston and cable arrangement and operable horizontally, vertically or at any desired angle with respect to ground level, where provision is made for reducing or eliminating cable slack during usage.

---

As is known, a conventional backhoe, for example, has limitations during operation, including the inability to excavate a hole without leaving undesired earth, which, oftentimes, is necessary to hand remove from the digging operation. Moreover, a need has become evident for excavating equipment which can dig vertically, horizontally, or at an angle with reference to ground level. Additionally, and as a matter of economics, it is desirable to provide excavating equipment in the form of an attachment, either to existing excavating equipment, or, for any type of vehicle, which permits various operational end functions as the user may desire.

By virtue of the invention, an important attachment is provided for use in conjunction with an existing backhoe or other vehicle, affording excellent end results with various types of specialized equipment used in combination therewith, as, for example, an orange peel bucket, a common backhoe bucket, or a grading bucket.

The invention comprises a framework pivotally mounted to the aforesaid vehicle or backhoe, and a raisable and lowerable mast. The mast may mount any desired attachment at the bottom end thereof, and its movement with respect to the mounting framework is through a hydraulically controlled piston and cable arrangement, where the number of passes of cable so controlled defines the operational scope of the attachment.

Additionally, the invention provides an important arrangement for reducing or eliminating the slack in the cables during usage, again interconnected with the hydraulic system for the over-all apparatus.

A better understanding of the present invention will become more apparent from the following description, taken in conjunction with the accompanying drawings, wherein FIG. 1 is a view in side elevation of the attachment forming the instant invention, where a modified existing backhoe, typifying one use of the attachment, is shown in phantom lines;

FIG. 2 is another view in elevation, looking from right to left in FIG. 1, showing structural details of the invention, where, however, some components are omitted for reasons of clarity;

FIG. 3 is a plan view, partly in horizontal section, taken at the top of the framework of FIG. 1 and looking downwardly, showing still further details of the invention;

FIG. 4 is an enlarged detailed view showing the instant new and novel approach to tensioning the cables employed in the invention during usage; and FIG. 5 is a fragmentary representative view, looking from right to left in FIG. 2, showing certain details of the cable arrangement.

Figure 1:
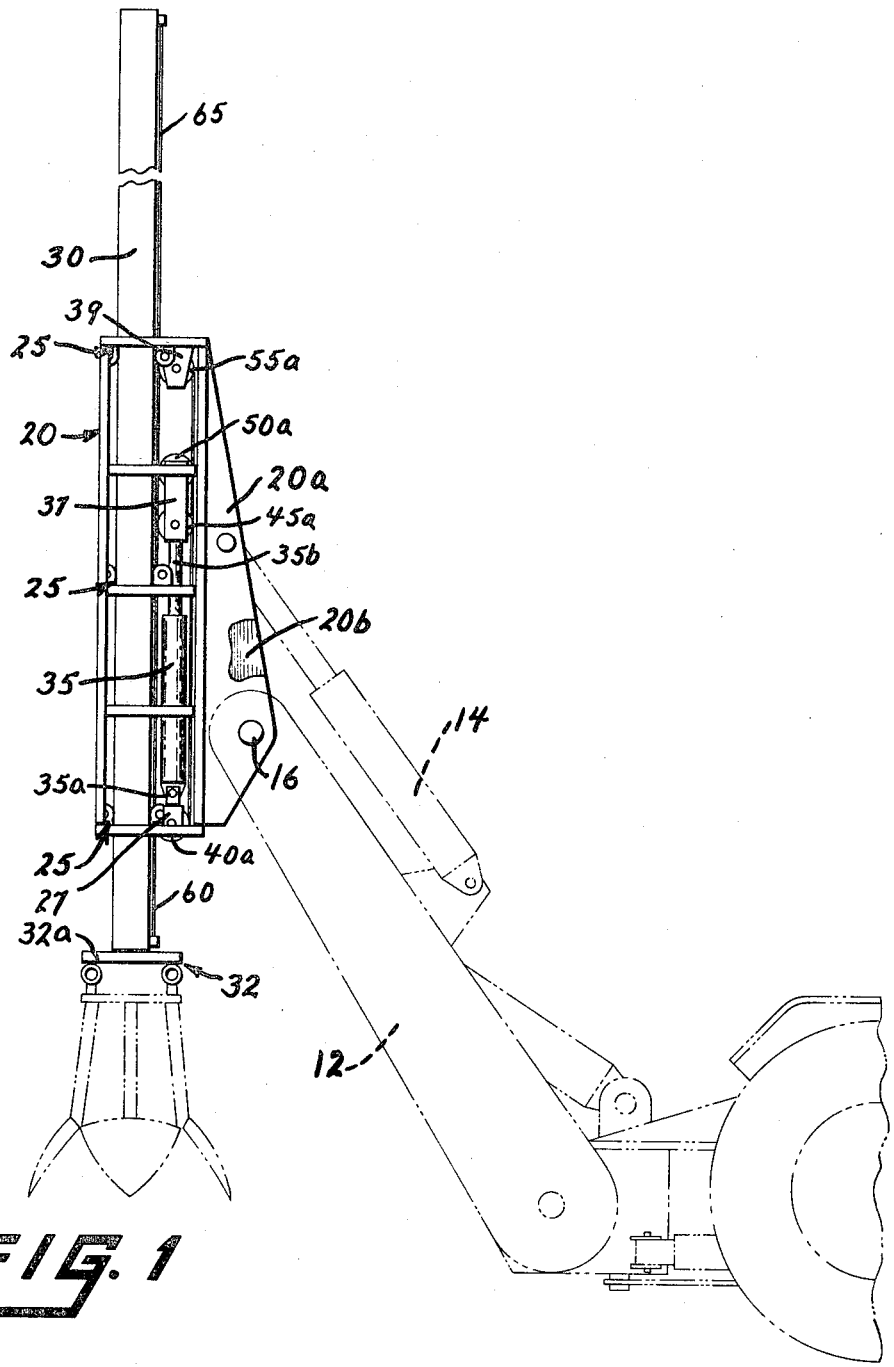

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Referring now to the figures, and by way of illustration, the attachment of the invention will be described in conjunction with a conventional backhoe, a portion of the latter being shown in phantom lines in FIG. 1. As is known, a backhoe comprises a driving unit mounting a hydraulic power system, where a support arm 12 extends upwardly and rearwardly therefrom. Additionally, a hydraulically controlled power cylinder 14 is mounted on such support arm 12. It should be understood that any equipment common to a known backhoe, and beyond the support arm 12 and the power cylinder 14, is removed, and the invention substituted.

The invention comprises a framework 20, which may assume various structural configurations, mounted by pin means 16 to the aforesaid support arm 12, such pin means 16 extending through plate members 20a and 20b. As is known, the support arm 12 may be pivoted hydraulically and, hence, framework 20 moved upwardly or downwardly, either vertically or inclined, with respect to the ground level. Angular movement of the framework 20 is further controlled through a connection with the power cylinder 14. In other words, and importantly, the framework 20 may be inclined during digging action, maintained vertically, or maintained horizontally.

As evident from FIGS. 1 and 3, a mast 30 is movable within the framework 20, where, at several locations, roller assemblies 25, mounted on the framework 20, are provided to confine the upward and downward movement of the mast 30, being identifiable as roller assemblies 25a, 25b, 25c and 25d (see FIG. 3).

The mast 30 may be a hollow member, as shown, or may assume other configurations, such as an I-beam, for example. A mounting arrangement 32 is provided at the lower or bottom end of the mast 30 for readily securing any desired attachment to the invention, as the aforesaid orange peel bucket (shown in phantom). The mounting arrangement 32 may also assume various forms, but that illustrated utilizes a slidable pin (not shown) in combination with tubular elements on each side of a base plate 32a, assembling being achieved by passing such pins through the tubular elements and aligned tubular elements on the attachment.

Referring to FIGS. 1 and 2, a hydraulic double-acting control cylinder 35 is mounted within the framework 20. Typically, the control cylinder 35 may be pivotally mounted, at 35a, on a plate 27 forming part of a support for a grouping of rotatably mounted sheaves 40a, 40b and 40c, the latter each having a separator 41 therebetween. The movable piston 35b of the cylinder 35 has a U-shaped support frame 37 secured thereto, where two groupings of rotatably mounted sheaves 45a, 45b and 45c and 50a, 50b and 50c are positioned thereon, with separators 51 being provided. Another grouping of rotatably mounted sheaves 55a, 55b and 55c are positioned on support members 39 disposed on the framework 20, also including separators 56.

In order to control the movement of the mast 30, either in one direction or the other, cables 60 and 65 are provided. In this connection, one end of cable 60 is secured to the piston 70a of a power cylinder 70, where the latter is pivotally mounted on a portion of the framework 20, at 71. The path of the cable 60 from the power cylinder 70 is around sheave 50a, sheave 55a, sheave 50b, sheave 55b, sheave 50c, sheave 55c, and then downwardly to be secured to the bottom end of the mast 30 (see FIGS. 1, 2 and 5).

One end of cable 65 is similarly connected to the movable piston 75a of a power cylinder 75, the latter being pivotally mounted, at 76, to a portion of the framework 20. The path of the cable 65 from the power cylinder 75 is around sheave 45a, sheave 40a, sheave 45b, sheave 40b, sheave 45c, sheave 40c, and upwardly to be secured to the top end of the mast 30 (again see FIGS. 1, 2 and 5).

The aforesaid power cylinders 70 and 75 are provided as a means for maintaining tension on whichever of the cables 60 and 65 is in a slackened condition. In this connection, and with reference to FIG. 4, a line 77, connecting to the cylinder 35 of the hydraulic system, introduces, at the operator's control, hydraulic fluid through a uni-directional check valve 79, the latter feeding into the power cylinder 75 to move the piston 75a. Depending upon the direction the mast 30 is being moved, an appropriate hydraulic connection is simultaneously made to the power cylinder at the end of the slackened cable, moving the piston towards the mounted end of the cylinder and, therefore, providing tension on the cable. When the mast 30 is moved downwardly, the hydraulic line to cylinder 70 transmits power, and when the mast 30 is moved upwardly, the hydraulic line to cylinder 75 transmits power.

The cable arrangement of the invention provides an important mechanical advantage to the user of the attachment. In normal operation, the movement of the double-acting control cylinder 35 and, hence, the piston 35b, is controlled by a valve (not shown) forming part of the hydraulic system on the vehicle which carries the invention. For reasons of clarity, the lines forming part of the hydraulic system and feeding into the cylinders 35 are not shown, being conventional in form. It should be understood that only one additional hydraulic control is required over that already in use on known backhoe equipment.

The position of the mast 30 in the figures is representative of a "mid" position. In use, and when the operator desires to move mast 30 to a lower position, to achieve digging action, for example, piston 35b is caused to move downwardly, through movement of a hydraulic control valve (not shown), meaning that all of the sheaves 45a, 45b, 45c, 50a, 50b and 50c, being mounted on member 37, are movable therewith.

With such movement of member 37, the cable 65 is placed under tension, while the cable 60 is slackened, the converse being true when the member 37 is moved upwardly, i.e. in an opposite direction. In any event, it should be understood that the optimum mechanical advantage for the attachment is provided by the cable and the sheaves arrangement, where, the number of sheaves controls the length of the stroke.

As stated, and depending upon the direction of movement of the piston 35b of the cylinder 35, a hydraulic path is created to either the power cylinder 70 or 75 of the slackened cable, forcing movement of the piston 70a or 75b to provide cable tensioning, any backward movement thereof being prevented by reason of the uni-directional check valve 79. The preceding serves to eliminate cable slack and eliminates any cable slippage from the sheaves.

Another hydraulic control valve (also not shown) serves to control the operation of the specialized equipment mounted on the mast 30, where, as stated, the attachment may be positioned, by pivoting at 16 on arm 12, and through the power cylinder 14, in any desired operational position, i.e. vertical, horizontal, or at any desired angular displacement with respect to ground level.

From the preceding, it should be apparent that the invention provides versatility and durability in use. Importantly, the invention may be mounted on any vehicle having the necessary power source, to achieve highly effective end results.

The attachment is susceptible to various changes within the spirit of the invention. For example, not only may the number of sheaves be changed, as mentioned above, but the mast length heightened or shortened, as desired. Additionally, other means may be employed for permitting sliding movement of the mast 30 within the framework 20, i.e. a substitute for the roller assemblies 25. Thus, the above description should be considered illustrative and not as limiting the scope of the following claims.

I claim:

1. An attachment for mounting specialized equipment comprising a framework pivotally positioned on a support area extending from a vehicle, a tool carrying mast slidable in a reciprocating relationship with respect to said framework, a power cylinder having a movable member, an arrangement of sheaves mounted on said movable member, other sheaves mounted on said framework, and cables each having one end secured to said framework and an opposite end secured to opposite ends of said mast traveling in selected paths over said sheaves, one of said paths controlling movement of said tool carrying mast in one direction and another of said paths controlling movement of said tool carrying mast in an opposite direction, depending upon movement of said movable member.

2. The attachment of claim 1 where a first sheave set and a second sheave set are mounted on said movable member, where said other sheaves are defined as a third sheave set and a fourth sheave set mounted proximate opposite ends of said framework.

3. The attachment of claim 2 where said selected paths of said cables include said first and third sheave sets and said second and fourth sheave sets.

4. The attachment of claim 1 where said power cylinder is part of a hydraulic system.

5. An attachment for mounting specialized equipment comprising a framework, a mast slidable with respect to said framework, a power cylinder having a movable member, an arrangement of sheaves mounted on said movable member, other sheaves mounted on said framework, other power cylinders each having a movable member mounted on said framework, and cables each having one end secured to said movable members of said other power cylinders and an opposite end secured to opposite ends of said mast traveling in selected paths over said sheaves, where said movable members of said other power cylinders selectively tension said cables.

6. The attachment of claim 5 where said other power cylinders are part of an hydraulic system.

7. The attachment of claim 6 where uni-directional valve means are included in the hydraulic paths communicating with said other power cylinders.

References Cited

UNITED STATES PATENTS

| | | | |
|---|---|---|---|
| 981,268 | 1/1911 | Hurd | 254—189 |
| 1,937,432 | 11/1933 | Messick | 214—135 |
| 2,627,943 | 2/1953 | Hastings | 254—189 |

EVON C. BLUNK, *Primary Examiner.*

H. C. HORNSBY, *Assistant Examiner.*